US006654818B1

(12) United States Patent
Thurber

(10) Patent No.: US 6,654,818 B1
(45) Date of Patent: Nov. 25, 2003

(54) DMA ACCESS AUTHORIZATION FOR 64-BIT I/O ADAPTERS ON PCI BUS

(75) Inventor: Steven Mark Thurber, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 427 days.

(21) Appl. No.: 09/599,179

(22) Filed: Jun. 22, 2000

(51) Int. Cl.[7] .................................................. G06F 3/00
(52) U.S. Cl. ................................ 710/3; 710/23; 710/26; 710/28; 710/305; 710/308; 710/314; 711/202; 711/210
(58) Field of Search ................................ 710/3, 23, 26, 710/28, 305, 308, 314; 711/202, 210

(56) References Cited

U.S. PATENT DOCUMENTS

| | | | | |
|---|---|---|---|---|
| 5,325,489 A | * | 6/1994 | Mitsuhira et al. ............. | 710/22 |
| 5,551,006 A | * | 8/1996 | Kulkarni ..................... | 711/146 |
| 6,078,742 A | * | 6/2000 | Chow .......................... | 703/25 |
| 6,138,192 A | * | 10/2000 | Hausauer ..................... | 710/100 |
| 6,173,383 B1 | * | 1/2001 | Casamatta ................... | 711/202 |
| 6,266,731 B1 | * | 7/2001 | Riley et al. ................. | 710/313 |
| 6,446,141 B1 | * | 9/2002 | Nolan et al. .................. | 710/8 |

* cited by examiner

Primary Examiner—Jeffrey Gaffin
Assistant Examiner—Niketa Patel

(74) Attorney, Agent, or Firm—Joseph P. Lally; Mark E. McBurney

(57) ABSTRACT

A method, data processing system, and I/O subsystem suitable for authorizing DMA accesses requested by a 64-bit I/O adapter are disclosed. The system includes one or more processors that have access to a system memory. A host bridge is connected between the processor(s) and an I/O bus. A first I/O adapter, which generates 32-bit addresses, is coupled to the host bridge. A second I/O adapter coupled to the host bridge is enabled to generate an address with a width greater than 32-bits (such as a 64-bit address). The system may include a Translation Control Entry (TCE) table, that is configured with information needed to translate an address generated by the 32-bit adapter to a wider address (such as a 64-bit address). In addition, the TCE may determine whether DMA access to the translated address by the requesting adapter is authorized. The system further includes an Access Control Table (ACT). The ACT determines whether DMA access to the address generated by the 64-bit I/O adapter is authorized. The ACT may be formatted as a set of ACT entries where each ACT entry corresponds to a unique portion of the system's memory address space. In one embodiment, each ACT entry consists of a single bit that indicates access to a 256 MB or larger portion of the system memory address space. In one embodiment, the I/O bus is a PCI bus. The first and second I/O adapters may be connected to a secondary PCI bus that communicates with the primary PCI bus via a PCI-to-PCI bridge. In one embodiment, each 64-bit I/O adapter has its own ACT table and portions of the ACT table may reside in the PCI-to-PCI bridge.

20 Claims, 4 Drawing Sheets

DMA ACCESS AUTHORIZATION FOR 64-BIT I/O ADAPTERS ON PCI BUS

BACKGROUND

1. Field of the Present Invention

The present invention generally relates to the field of input/output (I/O) busses and more particularly to a protection method and mechanism suitable for use in a 64-bit addressing system that includes a 64-bit I/O adapter.

2. History of Related Art

In the field of microprocessor based data processing systems, the use of industry standard I/O busses to improve the performance and expand the capabilities of the data processing systems is well known. Standardized I/O busses provide a mechanism for connecting a wide variety of peripheral devices to the host bus of a data processing system. Peripheral devices may include, for example, high speed network adapters, hard-disk controllers, graphics adapters, audio adapters, and a variety of other devices. Among the most prevalent of the industry standard I/O busses is the Peripheral Component Interface (PCI) bus. The PCI bus has evolved over the years from revision 2.0 introduced in 1992 operating at a bus frequency of 33 MHz, to revision 2.1 introduced in 1995 with a maximum bus frequency of 66 MHz, to revision 2.2 introduced in 1998 and incorporating features such as message interrupts. Complete documentation of the PCI Local Bus Specification Rev. 2.2 (PCI Spec 2.2) is available from the PCI special interest group, 2575 N. E. Kathryn #17, Hillsboro, Oreg. 97124 (website www.pcisig.com). Under PCI Spec 2.2, PCI bridges support two types of transactions: posted transactions (including memory write cycles), which complete on the initiating bus before they complete on the target bus, and delayed transactions (including memory read requests and I/O and configuration read/write requests), which complete on the target bus before they complete on the initiating bus. A PCI device that initiates a delayed transaction must relinquish control of the local PCI bus and wait for the target device to return the requested data (in the case of a delayed read request) or a completion message (in the case of a delayed write request). Once the requested information has arrived, the requesting device must wait until it again receives control of the PCI bus in the normal course of operations before it can retrieve the information from the PCI bridge.

More recently, the PCI-X Addendum to Local Bus Specification Rev. 2.2 has been proposed as a means for further improving the performance of PCI busses. The PCI-X Addendum incorporates registered transactions that improve performance by permitting a PCI-X compatible bridge or I/O adapter to make decisions on every other clock cycle. In addition, PCI-X incorporates protocol enhancements such as the attribute phase and split transactions that allow more efficient use of the bus. PCI-X is fully backward compatible with conventional PCI systems such that conventional PCI adapters will work in PCI-X capable systems and PCI-X adapters will work in PCI systems. If a conventional PCI device is located on a PCI-X bus, however, all adapters on the bus must operate in conventional PCI mode regardless of whether they are PCI-X capable. For complete PCI-X documentation, the reader is referred to the PCI-X Addendum 1.0 Final Release available from the PCI Special Interest Group.

A high percentage of I/O adapters (IOA's) support a maximum of 32 address bits. Such adapters are capable of addressing only 4 GB of system memory address space. With increasing frequency however, these 32-bit I/O adapters are installed in systems that support 64-bit addressing. IOA's that are only cable of accessing 4 GB need a way to access above that limit when used in 64-bit addressing systems when the addressing requirements exceed the 4 GB limit. This could be accomplished with a device driver that transfers the data to a DMA buffer within the first 4 GB of system memory and then re-transferring the data to memory residing above 4 GB with a software data move. This solution, however, may have a significant impact on performance and it is in these larger systems where performance is generally the most critical. To address this problem, the use of Translation Control Entry (TCE) tables are used to facilitate the translation of DMA addresses generated by 32-bit I/O adapters in systems that support addressing of more than 32-bits. In addition, the TCE table provides status bits for each entry that are used to enforce memory protection. If the protection status bits of a particular TCE have a specified value, an IOA will be unable to access the portion of system memory address space that corresponds to the entry.

The use of TCE tables in conventional systems, while addressing the problem of address translation between IOA's and system memory, can potentially limit performance in systems that also include IOA's that support 64-bit addressing. Although no address translation is needed for addresses generated by 64-bit IOA's, conventional systems may force the address generated by a 64-bit adapter through the TCE mechanism to utilize the protection mechanism provided by the TCE table. The use of extensive TCE tables that typically have limited granularity (i.e., each TCE corresponds to a small portion of the memory address space) is an inefficient method of implementing protection for 64-bit IOA's because the translation bits in each TCE are unnecessary for 64 bit I/O adapters. In addition, the relatively small page size associated with each TCE may result in excess retrieval of the TCE (which typically resides in system memory) thereby potentially limiting performance. It would therefore be desirable to implement an efficient protection mechanism in a data processing system that includes 64-bit IOA's.

SUMMARY OF THE INVENTION

The problem identified above is addressed by a method, data processing system, and I/O subsystem suitable for authorizing DMA accesses requested by a 64-bit I/O adapter as disclosed herein. The system includes one or more processors that have access to a system memory. A host bridge is connected between the processor(s) and an I/O bus such as a PCI bus. A first I/O adapter, which generates 32-bit addresses, may be coupled to the host bridge. A second I/O adapter coupled to the host bridge is enabled to generate an address with a width. greater than 32-bits (such as a 64-bit address). The system may include a Translation Control Entry (TCE) table that is configured with information needed to translate an address generated by the 32-bit adapter to a wider address (such as a 64-bit address). In addition, the TCE may determine whether DMA access to the translated address by the requesting adapter is authorized. The system further includes one or Access Control Tables (ACTs). An ACT determines whether DMA access to the system memory address generated by a 64-bit I/O adapter is authorized. The ACT may be formatted as a set of ACT entries where each ACT entry corresponds to a unique portion of the system's memory address space. In one embodiment, each ACT entry consists of a single bit that indicates access to a 256 MB or larger portion of the system memory address space. The first and second I/O adapters may be connected to a secondary PCI bus that communicates with the primary PCI bus via a PCI-to-PCI bridge. In one embodiment, each 64-bit I/O adapter has its own ACT table and portions of the ACT table may reside in the PCI-to-PCI bridge.

BRIEF DESCRIPTION OF THE DRAWINGS

Other objects and advantages of the invention will become apparent upon reading the following detailed description and upon reference to the accompanying drawings in which.

Figure 1:
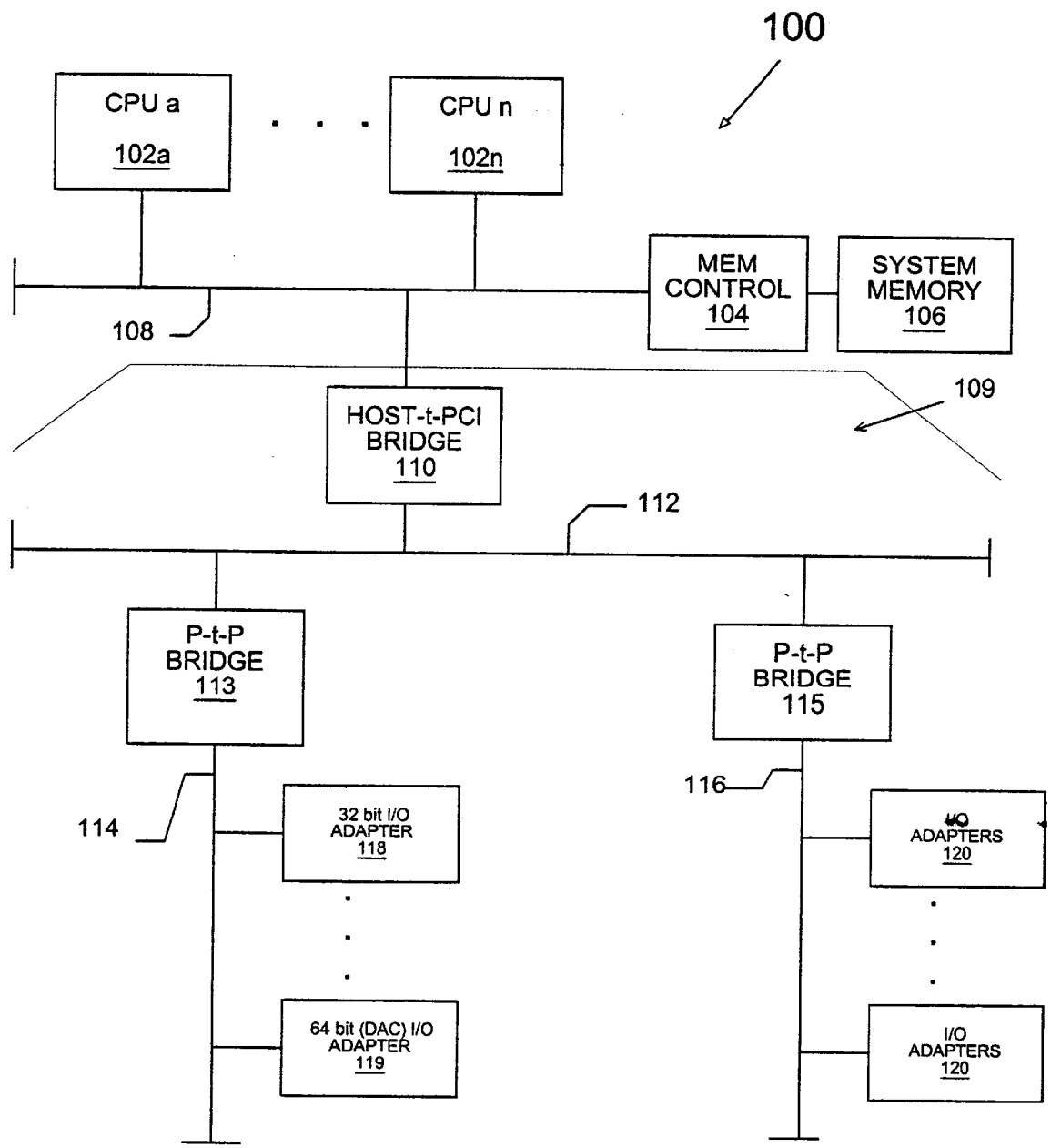
FIG. 1 is a simplified block diagram of a data processing system according to an embodiment of the invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF A PREFERRED EMBODIMENT OF THE PRESENT INVENTION

Turning now to the drawings, FIG. 1 is a simplified block diagram representation of a data processing system 100 according to one embodiment of the present invention. The depicted embodiment of data processing system 100 includes one or more central processing units 102a ... 102n (generically or collectively referred to herein as processor(s) 102) coupled to a host bus 108. The invention is not limited to a particular implementation of processors 102 and any of a variety of commercially distributed processor architecture families are suitable for use with the invention as contemplated herein. Each processor 102 has access to a system memory 106 via a memory controller 104 coupled to host bus 108. Although the depicted embodiment indicates memory controller 104 as a discreet unit, it will be appreciated that the function of memory controller 104 may be integrated into each of the processors 102 or integrated into system memory 106. Typically, data processing system 100 supports 64-bit addressing. Thus, the preferred embodiment of system 100 is capable of addressing a maximum of 16 Exabytes (EB) (1EB=$2^{60}$ Bytes=$2^{30}$ GB).

System 100 further includes an I/O subsystem 109 suitable for coupling to host bus 108. I/O subsystem 109 includes a PCI-X host bridge 110, a primary PCI bus 112 and secondary busses and adapters that communicate with host bus 108 via PCI host bridge 110. For a given PCI bus 112 operating at a given frequency, the number of devices or adapters that can be attached to the bus is limited. To expand the capabilities of computer system 100 beyond more than four slotted devices, PCI-to-PCI (P-t-P) bridges are attached to primary PCI bus 112 to provide one or more secondary busses. In the embodiment depicted in FIG. 1, P-t-P bridge 113 is coupled between primary PCI bus 112 and a first secondary PCI bus 114 while P-t-P bridge 115 is coupled between primary PCI bus 112 and a second secondary PCI bus 116. In the depicted embodiment, a 32-bit IOA 118 and a 64-bit IOA are connected to first secondary PCI bus 114 while additional I/O adapters 120 (which may be 64-bit IOA's, 32-bit IOA's, or a combination of both) are connected to a second secondary PCI bus 116.

As discussed previously, the 32-bit IOA 118, which used in a 64-bit addressing system, is typically managed through the use of an address translation mechanism such as a TCE table. The conventional TCE table (as described in greater detail below) provides, in addition to an address translation mechanism, a valuable protection mechanism as well. In systems that include 64-bit IOA's as well as 32-bit IOA's, addresses generated by the 64-bit IOA were frequently forced through the TCE mechanism as a means of providing page protection. The use of the 32bit translation mechanism as a page protection mechanism for 64-bit IOA's is inefficient because large portions of the TCE table are not needed for a 64-bit IOA and because the granularity associated with conventional TCE's results in unnecessarily frequent TCE fetches when used in conjunction with a 64-bit IOA.

Figure 2:
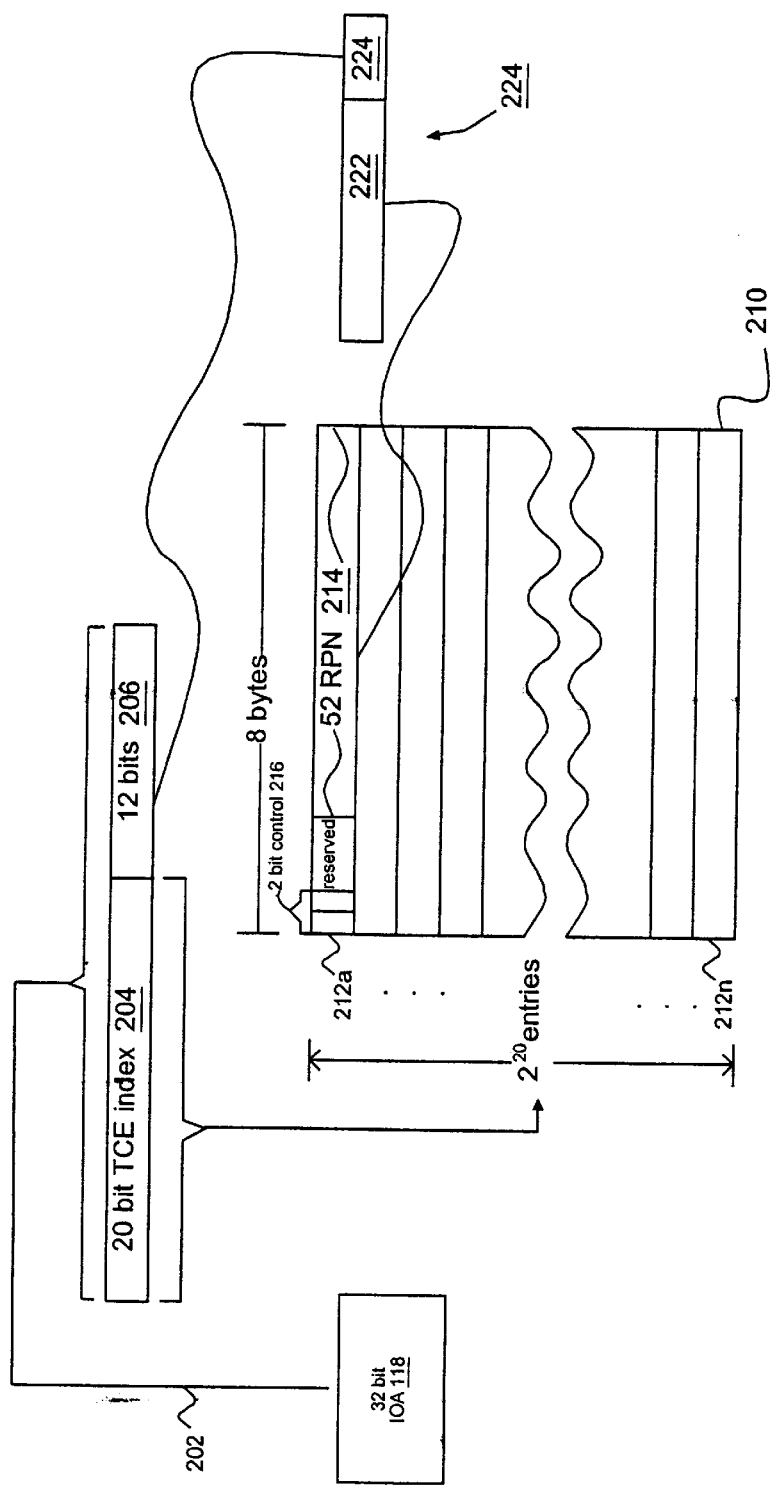
FIG. 2 illustrates an address translation mechanism for translating a 32-bit IOA address to a 64-bit address according to the prior art.
Figure 3:
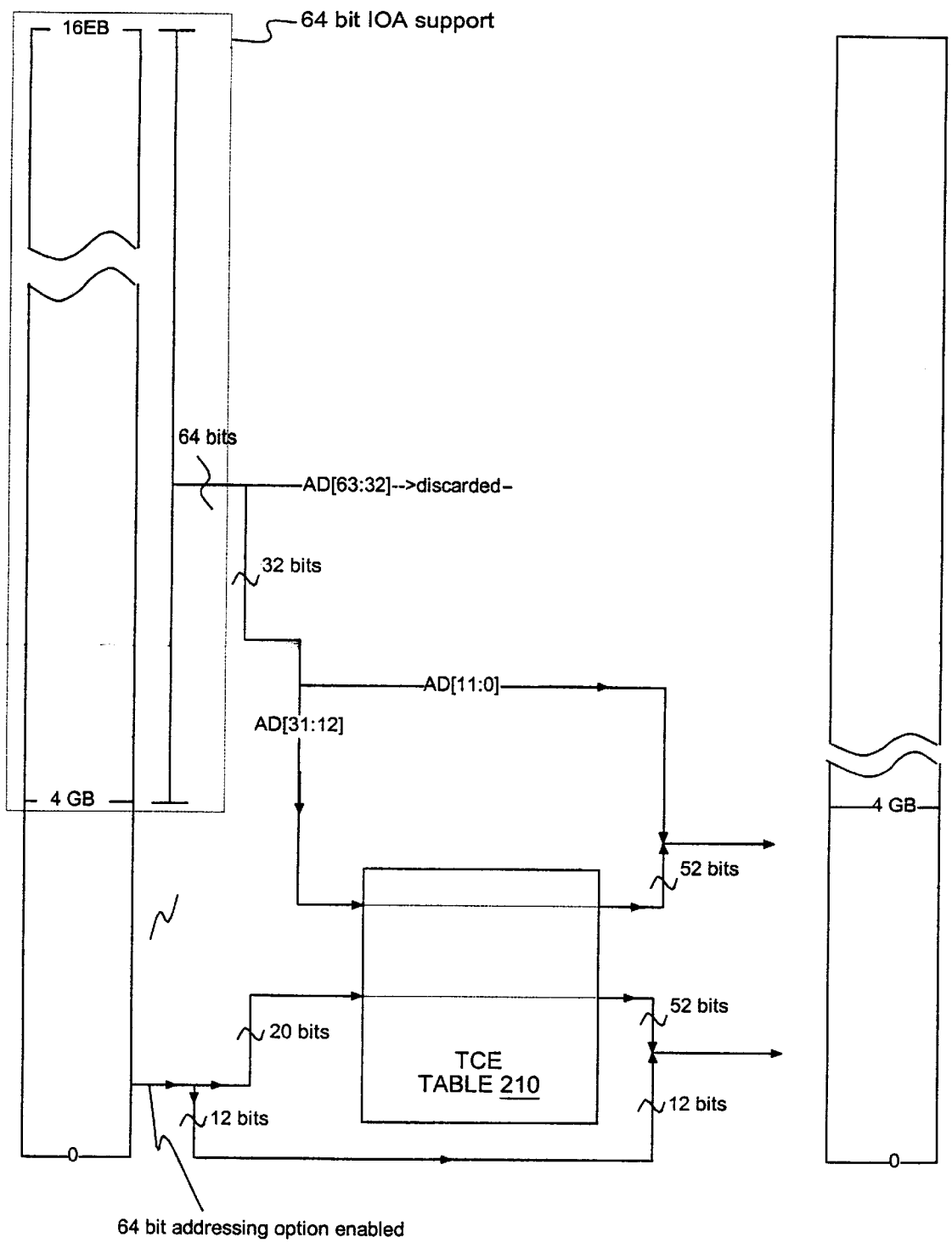
FIG. 3 further illustrates the address translation mechanism using a translation control entry (TCE) according to the prior art.

Turning now to FIG. 2 and FIG. 3, diagrams illustrating the use of a conventional TCE table 210 in a system that includes both 32-bit and 64-bit IOA's is depicted. The 32-bit address 202 generated by 32-bit IOA 118 is logically broken into a 20-bit TCE index 204 and a 12-bit address portion 206. The 20-bit index 204 is used to select one of up to $2^{20}$ entries (212a, ... 212n), generically or collectively referred to herein as TCE entry or entries 212, in TCE table 210. The TCE table 210 is setup and maintained by trusted code whether by a hyperviser in a logically partitioned (LPAR) embodiment of system 100 or by operating system code in a non-LPAR embodiment. In an LPAR embodiment of system 100, the system resources (processors, memory, IOA's, etc., are assigned to a partition and are not shared between partitions. In this manner, each logical partition is secured against the other partitions such that, if one partition fails, other partitions may continue to operate.

Each entry 212 in the depicted embodiment of TCE table 210 is an 8-byte entry that includes a 52-bit Real Page Number (RPN) 214 and a 2-bit control field 216. The RPN 214 indicates the high order 52-bit portion 222 of the 64-bit address 220 to which the 32-bit address 202 is translated. The 12-bit address portion 206 of 32-bit address 202 is routed directly (without translation) to become the low order 12-bits 224 of the 64-bit address 220. For systems in which the system address space exceeds 32-bits but is less than 64-bits, the RPN 214 may comprise less than 52-bits.

The 2-bit control field 216 is used to indicate a page fault and whether the page addressed by the 20-bit TCE index 204 is read/write, read-only, or write only. The page fault status may be used as part of a memory space protection mechanism to indicate that access to a requested portion of memory is not authorized. The translation defined in a particular TCE table entry 212 indicates, via the 2-bit control field 216 whether or not the entry is valid. In this manner, TCE table 210 provides a mechanism for translating addresses generated by 32-bit IOA 118 to a 64-bit address and for determining whether the DMA access to the translated address is authorized. In addition, 32-bit IOA 118 is typically prevented from accessing a specified range of TCE table 210 by routing tables in PCI-to-PCI bridge 113.

Combining hardware control that restricts the portions of the TCE table that an IOA can access with a trusted TCE translation allows an IOA to access system address under tight security control. The protection mechanism provided by the TCE is especially important in (LPAR) systems where it is essential to rigorously protect the logical division between partitions.

In the depicted embodiment, TCE table 210 is an 8 MB table ($2^{20}$ entries x (8B/entry)) where each entry 212 corresponds to just 4 KB (1 page) of the memory address space. To enforce protection when the 64-bit IOA 119 generates an address, a system may simply prevent the IOA from addressing above 4 GB (such as by setting the high order 32-bits of the address to 0) and forcing the address through TCE table 210 as depicted in FIG. 3. While such a practice nullifies a significant benefit of a 64-bit IOA, it emphasizes the importance of the protection mechanism in maintaining reliable operation.

Figure 4:
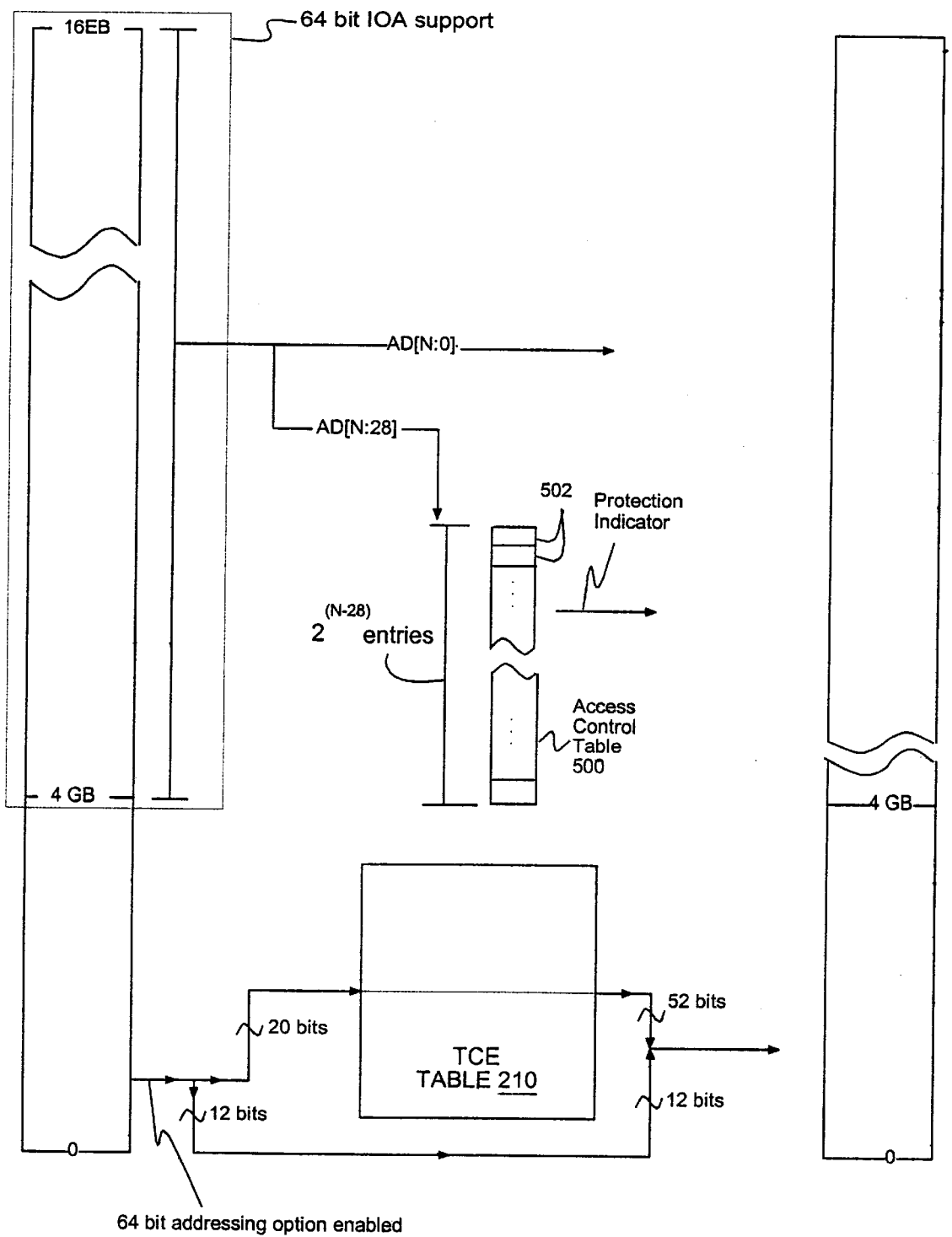
FIG. 4 illustrates a protection mechanism according to one embodiment of the present invention suitable for use with 64-bit IOA's.

While the protection mechanism provided by TCE table 210 is highly desirable, it is implemented inefficiently with respect to an IOA such as 64-bit IOA 119, which needs no address translation. The invention contemplates an efficient mechanism for providing protection in systems that include 64-bit IOA's. Turning now to FIG. 4, a protection mechanism suitable for providing protection in systems that include a 64-bit IOA and a 32-bit IOA is depicted. Addresses generated by 32-bit IOA 118 are handled by TCE table 210 as discussed previously with respect to FIG. 2. Addresses generated by 64-bit IOA, however, are used to look up an entry 502 in an Access Control Table (ACT) 500 to determine if the adapter is authorized to access to the requested portion of the memory address space (i.e., whether DMA access to the address generated by 64-bit IOA 119 is authorized). In one embodiment, each 64-bit IOA will have its own ACT 500. In contrast, TCE table 210 described previously corresponds to a particular Host-to-PCI bridge 110 (i.e., each host bridge 110 has its own TCE table 210).

In one embodiment, each entry 502 in ACT 500 includes a single bit that indicates whether a 64-bit IOA has DMA access to a portion of the memory address space that corresponds to the entry. In the embodiment depicted in FIG. 4, each entry 502 in ACT 500 corresponds to a 256 MB portion of system memory address space. This implementation is particularly suitable for use with a logically partitioned (LPAR) RS/6000® system from International Business Machines Corp., in which the memory resources are assigned to logical partitions in 256 MB granules. In this implementation, the address bits above the low order 28 address bits generated by IOA 119 (i.e., AD[(N-1):28] where N is the number of address bits) are used as an index or offset into ACT 500. If the entry 502 at the appropriate offset of ACT 500 is a specified value, PCI-to-PCI bridge 113 allows IOA 119 to perform the requested DMA access and passes all N bits of the address (i.e., no address translation) to the system memory.

ACT 500 typically resides in a contiguous portion of system memory. Portions of the ACT 500 are retrieved by and stored locally in PCI-to-PCI bridge 113. When 64-bit IOA 119, also sometimes referred to as a Dual Address Cycle (DAC) adapter, generates a 64-bit address, PCI-to-PCI bridge 113 determines whether it has the entry 502 of ACT 500 corresponding to the generated address stored locally. If it does not have the required entry 502 stored locally, PCI-to-PCI bridge 113 fetches from system memory a portion of ACT 500 that includes the needed entry 502. Because each entry fetched corresponds to a significant portion of the system memory address space (256 MB in the depicted embodiment), retrieval of only a relatively small number of entries 502 is required to encompass a large portion of the system memory address space. The relatively large granularity of ACT 500 compared to the TCE table 210 coupled with the lack of translation bits in ACT 500 results in a much smaller and more efficient mechanism for enforcing protection in a system that includes one or more 64-bit IOA's. A system with a 42-bit (4 Terabytes) real address space, as an example, includes $2^{14}$ (16 K) "pages" of 256 MB each. If half of the available address space is used for system memory, there are $2^{13}$ (8 K) 256 MB memory granules. Thus, an ACT 500 in which each entry 502 consists of just a single bit granule would require only 8 K bits. Recall, for comparison, that TCE table 210 required roughly 8 MB to map just 4 Gigabytes of address space.

It will be apparent to those skilled in the art having the benefit of this disclosure that the present invention contemplates a mechanism for efficiently monitoring I/O subsystems performance. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A data processing system, comprising:

a processor;

a system memory accessible to the processor;

a host bridge connected between the processor and an I/O bus;

a first I/O adapter coupled to the host bridge, wherein the first I/O adapter is enabled to generate a 32-bit address;

a second I/O adapter coupled to the host bridge, wherein the second I/O adapter is enabled to generate a 64-bit address;

a Translation Control Entry (TCE) table suitable for translating an address generated by the first adapter to a 64-bit address and for determining whether DMA access to the translated address is authorized; and an Access Control Table (ACT), distinct from the TCE and suitable for determining whether DMA access to the address generated by the second I/O adapter is authorized; and means for processing memory accesses generated by the first adapter through the TCE table and for processing memory accesses generated by the second adapter through the ACT wherein memory accesses generated by the second adapter avoid the TCE.

2. The system of claim 1, wherein the ACT includes a set of ACT entries wherein each ACT entry corresponds to a unique portion of the system's memory address space.

3. The system of claim 2, wherein each entry in the ACT includes a single bit indicative of whether an access to the corresponding system memory address space is authorized.

4. The system of claim 2, wherein the size of each unique portion of the memory address space to which each ACT entry corresponds is greater than the size of a portion of memory address space to which each TCE corresponds by a factor of at least 64 K ($2^{16}$).

5. The system of claim 4, wherein the system is characterized as a Logically Partitioned (LPAR) system wherein the system memory address space is logically assigned in 256 MB, and further wherein each unique portion of memory comprises 256 MB of address space.

6. The system of claim 1, wherein the I/O bus is characterized as a primary PCI bus and wherein the first and second I/O adapters are connected to a secondary PCI bus that is connected to the primary PCI bus via a PCI-to-PCI bridge.

7. The system of claim 6, wherein at least a portion of the ACT is resident in the PCI-to-PCI bridge.

8. The system of claim 1, further comprising a second 64-bit I/O adapter and a corresponding second ACT, wherein each 64-bit I/O adapter's access authorization is determined by its corresponding ACT.

9. In a data processing system, a memory access authorization method, comprising:
   responsive to detecting a memory access generated by a 32-bit I/O adapter, translating the 32-bit address to a 64-bit address and authorizing the 32-bit I/O adapter access based upon an entry in a translation control entry (TCE) table;
   responsive to detecting a memory access generated by a first 64-bit I/O adapter;
   determining the value of an entry in a first Access Control Table (ACT), wherein the entry corresponds to a portion of the system address space that includes the address of the memory access; and
   authorizing the 64-bit I/O adapter to access system memory at the memory access address if the determined value of the ACT entry is equal to a predetermined value, wherein memory accesses from the 64-bit adapter are authorized while avoiding the address translation mechanism of the TCE.

10. The method of claim 9, further comprising, responsive to detecting a second memory access generated by a second 64-entry I/O adapter, determining a portion of the system address space corresponding to the address of the second access, determining the value of a entry in a second ACT, and authorizing the second 64-entry I/O adapter to access system memory at the second generated address if the determined value of the entry in the second ACT is equal to a predetermined value.

11. The method of claim 9, wherein the ACT entry consists of a single bit indicative of whether access to the corresponding portion of system memory by the 64-bit adapter is permitted.

12. The method of claim 9, wherein each entry in the ACT corresponds to a unique portion of the system memory address space and further wherein the size of each unique portion is equal.

13. The method of claim 12, wherein the size of each unique portion of address space is at least 256 MB.

14. The method of claim 9, wherein each entry in the ACT corresponds to a portion of the system memory address space that is at least 64K larger than a portion of system memory address to which each TCE corresponds, wherein the number of entries in the ACT table is substantially smaller than the number of TCE's.

15. An I/O subsystem of a data processing system that includes processor and system memory, the subsystem comprising:
   a host bridge connected between a system bus and a primary PCI bus, wherein the host bridge is enabled to retrieve portions of a Translation Control Entry (TCE) table from system memory responsive to receiving a memory access address from a 32-bit I/O adapter; and
   a PCI-to-PCI bridge connected to the host PCI bridge, wherein the PCI-to-PCI bridge is enabled to retrieve portions of a first Access Control Table (ACT) from system memory responsive to receiving a memory access address from a first 64-bit I/O adapter and further enabled to determine whether the first 64-bit I/O adapter is authorized to access the received address wherein memory accesses from the 64-bit adapter are authorized while avoiding the translation mechanism of the TCE.

16. The I/O subsystem of claim 15, wherein the PCI-to-PCI bridge is further enabled to retrieve portions of a second ACT from system memory responsive to receiving a memory access address from a second 64-bit I/O adapter and further enabled to determine whether the second 64-bit I/O adapter is authorized to access the received address.

17. The I/O subsystem of claim 15, wherein the retrieved portion of the first ACT includes an entry that corresponds to a portion of system memory address space that includes the received 64-bit address.

18. The I/O subsystem of claim 17, wherein each entry in the first ACT consists of a single bit indicative of whether accesses to the corresponding portion of system memory are permitted.

19. The I/O subsystem of claim 18, wherein each entry in the first ACT corresponds to 256 MB of system memory address space and each TCE corresponds to 4 KB of memory space wherein the number of ACT entries is less than the number of TCE's by a factor of $2^{16}$.

20. The I/O subsystem of claim 15, further comprising:
   a second host bridge, additional PCI-to-PCI bridges connected to the second host bridge, and additional I/O adapters connected to the additional PCI-to-PCI bridges, the additional I/O adapters including additional 32-bit and additional 64-bit I/O adapters;
   wherein the second host bridge is enabled to retrieve portions of a second TCE table from system memory responsive to receiving a DMA address from one of the additional 32-bit I/O adapters and further enabled to generate a translated address from the received DMA address using the retrieved portion of the second TCE, wherein the width of the translated address exceeds 32 bits.

* * * * *